US011682107B2

(12) United States Patent
Shintani (10) Patent No.: US 11,682,107 B2
(45) Date of Patent: Jun. 20, 2023

(54) DEPTH OF FIELD ADJUSTMENT IN IMAGES BASED ON TIME OF FLIGHT DEPTH MAPS

(71) Applicant: SONY CORPORATION, Tokyo (JP)

(72) Inventor: Peter Shintani, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 1223 days.

(21) Appl. No.: 16/220,434

(22) Filed: Dec. 14, 2018

(65) Prior Publication Data

US 2020/0195909 A1 Jun. 18, 2020

(51) Int. Cl.
*H04N 13/271* (2018.01)
*G01S 17/89* (2020.01)
*G01S 17/32* (2020.01)
*G06T 5/00* (2006.01)
*G06F 3/01* (2006.01)
*G06V 10/25* (2022.01)

(52) U.S. Cl.
CPC ............ *H04N 13/271* (2018.05); *G01S 17/32* (2013.01); *G01S 17/89* (2013.01); *G06F 3/013* (2013.01); *G06T 5/002* (2013.01); *G06V 10/25* (2022.01)

(58) Field of Classification Search
None
See application file for complete search history.

(56) References Cited

U.S. PATENT DOCUMENTS

| 2009/0167923 | A1* | 7/2009 | Safaee-Rad | H04N 13/194 348/E5.042 |
| 2016/0037151 | A1* | 2/2016 | Lin | H04N 13/271 348/46 |
| 2018/0160048 | A1* | 6/2018 | Rainisto | H04N 13/271 |
| 2018/0249143 | A1* | 8/2018 | Calpe Maravilla | G01S 7/4814 |
| 2019/0058859 | A1* | 2/2019 | Price | H04N 13/271 |
| 2019/0066316 | A1* | 2/2019 | Bardagjy | G06T 7/521 |
| 2019/0101623 | A1* | 4/2019 | Galera | G01S 17/88 |

(Continued)

FOREIGN PATENT DOCUMENTS

CN 104315995 B 2/2017

OTHER PUBLICATIONS

Salinas, et al., "A New Approach for Combining Time-of-Flight and RGB Cameras Based on Depth-Dependent Planar Projective Transformations", Sep. 2015, 34 pages.

(Continued)

*Primary Examiner* — Reza Aghevli
(74) *Attorney, Agent, or Firm* — Chip Law Group (57) ABSTRACT

An image capturing apparatus and a method for depth of filed (DOF) adjustment in images based on time of flight (TOF) depth maps is provided. The image capturing apparatus includes an image sensor and circuitry. The circuitry generates a TOF depth map of a scene that includes a plurality of objects. The TOF depth map includes information associated with distances between the image sensor and surfaces of the plurality of objects. The circuitry divides the TOF depth map into a plurality of regions that corresponds to at least one object of the plurality of objects. The circuitry determines a region of interest from the plurality of regions and adjusts the DOF of the at least one object associated with the determined region of interest. The circuitry further controls the image sensor to capture an image of the scene based on the adjusted DOF.

18 Claims, 7 Drawing Sheets

(56) References Cited

U.S. PATENT DOCUMENTS

| | | | |
|---|---|---|---|
| 2019/0105514 A1* | 4/2019 | Amstutz | A61B 34/20 |
| 2019/0109977 A1* | 4/2019 | Dutton | G01S 17/894 |
| 2019/0147245 A1* | 5/2019 | Qi | G06V 20/647 |
| | | | 382/103 |
| 2019/0147676 A1* | 5/2019 | Madzhunkov | G06V 10/143 |
| | | | 340/5.2 |
| 2019/0162950 A1* | 5/2019 | Lapstun | H04N 13/243 |
| 2019/0213309 A1* | 7/2019 | Morestin | G06T 7/521 |
| 2019/0238824 A1* | 8/2019 | Lee | G06T 7/593 |
| 2019/0304115 A1* | 10/2019 | Sladkov | G01B 11/254 |
| 2020/0018833 A1* | 1/2020 | Ding | G01S 17/894 |
| 2020/0041620 A1* | 2/2020 | Onal | G01S 17/894 |
| 2020/0043143 A1* | 2/2020 | Territo | G06T 3/0075 |
| 2020/0074720 A1* | 3/2020 | But | G06T 7/521 |
| 2020/0092533 A1* | 3/2020 | Narasimhan | G01S 7/4817 |
| 2020/0097752 A1* | 3/2020 | De Salivet de Fouchecour | |
| | | | G01S 17/894 |
| 2020/0103507 A1* | 4/2020 | Kirillov | G01S 7/4817 |
| 2020/0142069 A1* | 5/2020 | Onal | G01S 17/10 |
| 2020/0226774 A1* | 7/2020 | Kaino | G06V 10/147 |
| 2021/0223371 A1* | 7/2021 | Meynants | G01S 17/42 |

OTHER PUBLICATIONS

Foix, et al., "Object Modeling using a ToF Camera under an Uncertainty Reduction Approach", 2010 IEEE International Conference on Robotics and Automation.

Larry Li, "Time-of-Flight Camera—An Introduction", Technical White Paper, SLOA190B, Jan. 2014. 10 pages.

* cited by examiner

DEPTH OF FIELD ADJUSTMENT IN IMAGES BASED ON TIME OF FLIGHT DEPTH MAPS

CROSS-REFERENCE TO RELATED APPLICATIONS/INCORPORATION BY REFERENCE

None.

FIELD

Various embodiments of the disclosure relate to camera technologies. More specifically, various embodiments of the disclosure relate to an image capturing apparatus and method for adjustment of depth of field (DOF) in images based on time of flight (TOF) depth maps.

BACKGROUND

Recent advancements in camera technology have led to the development of various techniques for addition of depth of field (DOF) in images based on a time of flight (TOF) system. In some scenarios, a conventional image capture device may have a multi-camera setup, in which a conventional image sensor may be present along with a TOF system. The TOF system may determine different DOF parameters in order to have a particular DOF for a specific region in an image. In order to achieve a particular DOF, the DOF parameters may be determined based on TOF data from the TOF systems. The image sensor may receive the DOF parameters as a feedback from the TOF system and may suitably apply different image processing techniques to add a DOF to a captured image of the object that may satisfy the DOF parameters. However, this may introduce artifacts in images due to incorrect estimation of a plane of focus (POF) for the specific region. The multi-camera setup may also escalate a computational cost for the addition of DOF to images and add to hardware requirements.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image capturing apparatus and method for adjustment of depth of field (DOF) in images based on time of flight (TOF) depth maps, is provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Certain embodiments of the disclosure may be found in disclosed apparatus for depth of field adjustment in images based on time of flight (TOF) depth maps. Exemplary aspects of the disclosure provide an image capturing apparatus that may be configured to generate a TOF depth map of a scene that includes a plurality of objects. The image capturing apparatus further adjusts a Depth of field (DOF) of different objects of interest from the plurality of objects in the scene. The image capturing apparatus may include an image sensor that captures an image of the scene based on the adjusted DOF of the region of interest. The adjustment of the DOF results in a sharpness or a focus on a specific objects in the captured image while remaining objects appear less sharp, blurry, or out of focus in the captured image. As compared to a conventional image capturing device, the disclosed image capturing apparatus provides a solution to adjust the DOF for a particular region of a scene without an implementation of different post-processing methods that includes application of complex image processing techniques on captured images. The disclosed image capturing apparatus further provides a solution to adjust the DOF for a particular region of a scene based on only a single image sensor that acts as a TOF system and an image sensor. Thus, the disclosed apparatus provides a cost-effective, space saving, and modular solution that doesn't require a multi-camera setup as compared to different conventional image capturing devices that conventionally use different post-processing methods to adjust a focus, or DOF, for a particular region of the scene in the captured images.

Figure 1:
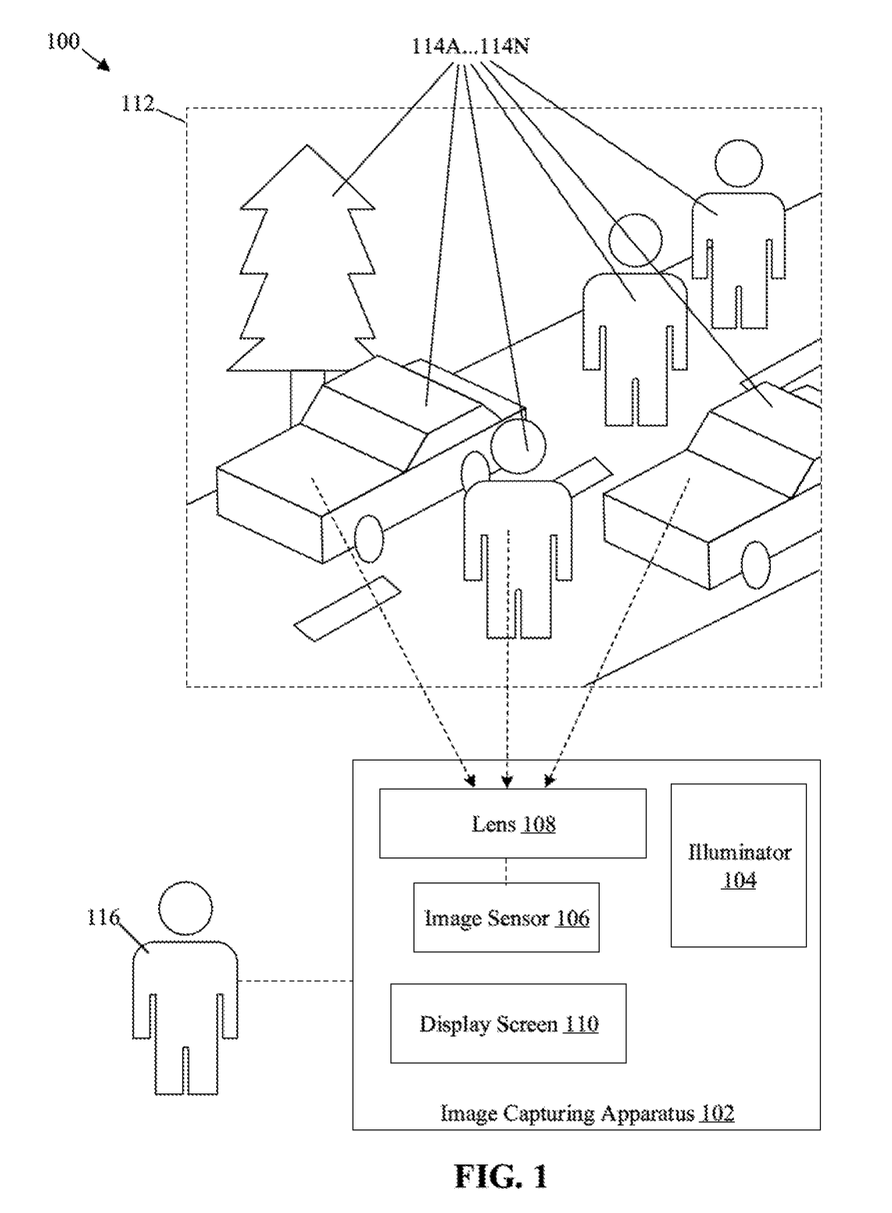
FIG. 1 is a block diagram that illustrates an exemplary environment for an image capturing apparatus that adjusts depth of field in images based on time of flight depth maps, in accordance with an embodiment of the disclosure.

FIG. 1 is a block diagram that illustrates an exemplary environment for an image capturing apparatus that adjusts depth of field in images based on time of flight depth maps, in accordance with an embodiment of the disclosure. With reference to FIG. 1, there is shown an environment 100. The environment 100 includes an image capturing apparatus 102. The image capturing apparatus 102 includes an illuminator 104, an image sensor 106, a lens 108, and a display screen 110. There is further shown a scene 112 present in a field-of-view (FOV) of the image capturing apparatus 102. The scene 112 may include a plurality of objects 114A . . . 114N at a particular time. The plurality of objects 114A . . . 114N may be either in a moving state or a rest state (i.e. a static state). There is further shown a user 116 of the image capturing apparatus 102.

The image capturing apparatus 102 may include suitable logic, circuitry, and interfaces that may be configured to capture an image of a scene, e.g., the scene 112, that includes a plurality of objects, e.g., the plurality of objects 114A . . . 114N. The image capturing apparatus 102 may be further configured to measure a phase delay of first light signals reflected from surfaces of at least the plurality of objects in the scene. The phase delay may be estimated from second light signals that may be a reflection of first light signals from the plurality of objects (e.g., the plurality of objects 114A . . . 114N). The image capturing apparatus 102 may be further configured to determine a time of flight (TOF) of the reflected second light signals based on the measured phase delay of the second light signals with respect to the first light signals. Examples of the image capturing apparatus 102 may include, but are not limited to, digital cameras, camcorders, camera phones, dash cams, closed circuit television (CCTV) cams, traffic cams, and cellular/mobile phones.

The illuminator 104 may comprise suitable logic, circuitry, and interfaces that may be configured to illuminate different objects from the plurality of objects in a foreground region and a background region of the scene. The foreground region includes the plurality of objects present in the FOV of the image capturing apparatus 102. The illuminator 104 may be configured to emit light signals to irradiate the plurality of objects. The illuminator 104 may facilitate determination of the TOF of the light signals emitted towards the plurality of objects (e.g., the plurality of objects 114A . . . 114N). The TOF may correspond to a difference in time of arrival of emitted first light signals from the illuminator 104 to that of the second light signals reflected from the plurality of objects (e.g., the plurality of objects 114A . . . 114N). Alternatively stated, the TOF may correspond to a difference in phase values of the reflected second light signals and emitted first light signals. In accordance with an embodiment, the illuminator 104 may be configured to emit the first light signals in form of light pulses to irradiate the plurality of objects. The light emitted from the illuminator 104 may be modulated to enable acquisition of high resolution TOF samples that corresponds to a plurality of points on the surface of the plurality of objects. Examples of the illuminator 104 may include, but are not limited to, Light Emitting Diodes (LEDs), flash LEDs, lasers, and IR lasers.

The image sensor 106 may comprise suitable logic, circuitry, and interfaces that may be configured to capture one or more images of a scene (for example, the scene 112) visible in the FOV of the image capturing apparatus 102. The image sensor 106 may be further configured to receive the second light signals reflected from the surface of the plurality of objects 114A . . . 114N to determine the TOF of the first light signals emitted from the illuminator 104. The image sensor 106 may be further configured to capture the one or more images of the scene based on the determined TOF of the first light signals. The image sensor 106 may be implemented as one of an active pixel sensor (such as a complementary metal oxide (CMOS) sensor), a passive pixel sensor (such as a charge coupled device (CCD) sensor), an oversampled binary image sensor, a planar Fourier capture array (PFCA), and a back-illuminated (BSI or BI) sensor, and the like. Although not shown, in some embodiments, the image sensor 106 may further include a specialized microprocessor (or a microcontroller), a co-processor, a memory, and/or a graphic processing unit (GPU) integrated with the image sensor 106.

The lens 108 may correspond to an optical lens or assembly of lenses used in conjunction with the image sensor 106 to capture one or more images of a scene (e.g., the scene 112) that includes a plurality of objects (e.g., the plurality of objects 114A . . . 114N).

The display screen 110 may comprise suitable logic, circuitry, interfaces that may be configured to display one or more images that represent a view of a scene (e.g., the scene 112). The display screen 110 may present a user interface (UI) to control a plurality of functions of the image capturing apparatus 102. The display screen 110 may be realized through several known technologies such as, a Liquid Crystal Display (LCD) display, a Light Emitting Diode (LED) display, a plasma display, and an Organic LED (OLED) display technology, and other display technologies. Alternatively, the display screen 110 be peripherally coupled to the image capturing apparatus 102. In such cases, the display screen 110 may refer to a smart-glass, a see-through display, a projection-based display, an electro-chromic display, or a transparent display.

In operation, the image capturing apparatus 102 may be configured to retrieve a preview feed of the scene in FOV of the image sensor 106. The preview feed may include a set of image frames that depicts a plurality of objects (e.g., the plurality of objects 114A . . . 114N) of a scene (e.g., the scene 112). The preview feed may be retrieved from a buffer memory, i.e., a non-persistent storage or a persistent storage of the image capturing apparatus 102.

The image capturing apparatus 102 may be further configured to display the preview feed onto the display screen 110 (e.g. a live preview screen of the image capturing apparatus 102) or an electronic viewfinder of the image capturing apparatus 102. The preview feed may be a live preview feed that may assist the user 116 to aim at the scene using the image capturing apparatus 102 and photograph one or more objects in focus from the plurality of objects.

In order to set a focus of the image capturing apparatus 102 on the one or more objects, a plane of focus (POF) may need to be determined. The POF may indicate an extent of a depth of field (DOF) for the one or more objects of the scene. In certain cases, the POF may be set to a depth at which the one or more objects are present, with respect to a focal plane of the image sensor 106. The image capturing apparatus 102 may be configured to operate as a TOF system that estimates distances between a plurality of points on the surfaces of the plurality of objects and the image sensor 106, as a matrix of depth values, which may be referred to as a TOF depth map. Also, the image capturing apparatus 102 may also operate as a photography device to capture images with a focus on one or more objects of a scene.

As a TOF system, the image capturing apparatus 102 may be configured to control the illuminator 104 to illuminate a foreground region and a background region of a scene (e.g., the scene 112). An amount of illumination may set a level of exposure on a focal plane of the image sensor 106. The level of exposure may also depend on different factors, such as a size of the image sensor 106, an aperture diameter (D), a lens position, an electronic shutter type, and an exposure period. The surfaces of the plurality of objects that lie in the FOV of the image capturing apparatus 102 may be illuminated by the first light signals emitted from the illuminator 104. In certain embodiments, the first light signals may be modulated and pulsed at a certain frequency and/or energy levels to uniformly irradiate the plurality of objects of a scene. In such cases, the energy levels may depend on different factors, such as a distance of different objects in the scene from the image plane of the image sensor 106 and an amount of ambient light in the scene.

The image capturing apparatus 102 may be further configured to receive, via the image sensor 106, the second light signals as a reflection of the first light signals from the surfaces of the plurality of objects. In certain embodiments, each pixel circuit in the image sensor 106 may act as a sensor circuit for estimation of TOF of incident light signals from different points on the surfaces of the plurality of objects (e.g., the plurality of objects 114A . . . 114N). For example, the image sensor 106 may be configured to implement an electronic shutter control technique to open and close each pixel circuit at the same rate as pulses of the first light signals are generated by the illuminator 104. Thus, each returning pulse may be captured at a different time of arrival at a corresponding pixel circuit and a level of exposure may depend on a distance the pulse may travel to and from the surfaces of the plurality of objects in the scene.

The image capturing apparatus 102 may be further configured to calculate the TOF of the first light signals emitted from the illuminator 104, based on a phase difference between the emitted first light signals and the second light signals reflected from the surfaces of the plurality of objects. The image capturing apparatus 102 may be further configured to calculate distances between the surfaces of plurality of objects and the image sensor 106 based on the calculated TOF of the first light signals. The image capturing apparatus 102 may be further configured to generate a TOF depth map of the scene based on the calculated distances between the surfaces of plurality of objects and the image sensor 106. The TOF depth map may include information associated with the distances between the image sensor 106 and a plurality of points on the surfaces of the plurality of objects.

The image capturing apparatus 102 may be further configured to divide the TOF depth map into a plurality of regions. The plurality of regions may correspond to the plurality of objects in the scene. Each region in the plurality of regions may correspond to a portion of the foreground region and the background region of the scene. The foreground region may include different objects (such as the plurality of objects 114A . . . 114N) of a scene (such as the scene 112), whereas the background region may include all the remnant portion of the scene (i.e. objects other than the plurality of objects).

The image capturing apparatus 102 may be further configured to determine a region from the plurality of regions as a region of interest associated with the scene. The region of interest from the plurality of regions may be associated with one or more objects of the plurality of objects. In order to determine the region of interest, the image capturing apparatus 102 may be configured to determine whether an eye movement tracking mode is selected by the user 116. In cases where the eye movement tracking mode is selected, the eye movement of the user 116 may be tracked. The image capturing apparatus 102 may be configured to track the eye movement of the user 116 corresponding to the one or more objects of the plurality of objects in the scene. At a specific time, a position of the eye in the tracked eye movement may indicate one or more objects in line of sight (LOS) or a focus of the user 116. Alternatively, a position of the eye in the tracked eye movement may indicate a focus point (e.g., an autofocus point (AF point) in the preview feed of the scene. Thus, the region of interest may correspond to a region in the TOF depth map that includes the one or more objects in the LOS of the user 116, based on the tracked eye movement of the user 116.

In cases where the eye tracking mode is not selected by the user 116, the image capturing apparatus 102 may be configured to receive a user-input in a threshold period of time. The user-input may be received via a user interface (UI) displayed onto the display screen 110 to select the region of interest from the plurality of regions associated with the scene. In cases where the user-input is not received in the threshold period of time, the image capturing apparatus 102 may be configured, by default, to select a center region of the scene as a region of interest from the plurality of regions. The determined region of interest may correspond to a POF of the image sensor 106. More specifically, the determined region of interest specifies a set of distance values between a plurality of points on surface(s) of the one or more objects in the scene and a focal plane of the image sensor 106. Thus, the determined region of interest in the TOF depth map specifies the set of distance values within which the POF of the image sensor 106 should lie in order to focus on the one or more objects in the scene.

The image capturing apparatus 102 may be configured to adjust a DOF of one or more objects of the plurality of objects in the scene. The depth of field may correspond to a distance until the one or more objects appear acceptably sharp in an image, e.g., an image from a preview feed or a captured image of the image capturing apparatus 102. The one or more objects may correspond to the determined region of interest in the generated TOF depth map. In some embodiments, the DOF of the one or more objects may be adjusted further based on the control of at least one of a position of the lens 108 (or a lens from the assembly of lenses) or an aperture size of an aperture stop on the lens 108. Such embodiments are described in detail, for example, in FIGS. 2, 3, 4, and 5.

The image capturing apparatus 102 may be further configured to capture an image of the scene within a FOV of the image capturing apparatus 102, based on the adjusted DOF of the one or more objects corresponding to the determined region of interest. The DOF is adjusted in the image based on the TOF depth map. The TOF depth map is generated by the same image sensor (such as the image sensor 106) that captures the image. In some cases, as a result of adjustment of the DOF, one or more objects may appear in focus in the captured image and remaining objects from the plurality of objects may appear out of focus (or blurry) in the captured image. The detailed operation of the image capturing apparatus 102 is further described in detail, for example, in FIGS. 2, 3, 4, and 5.

Figure 2:
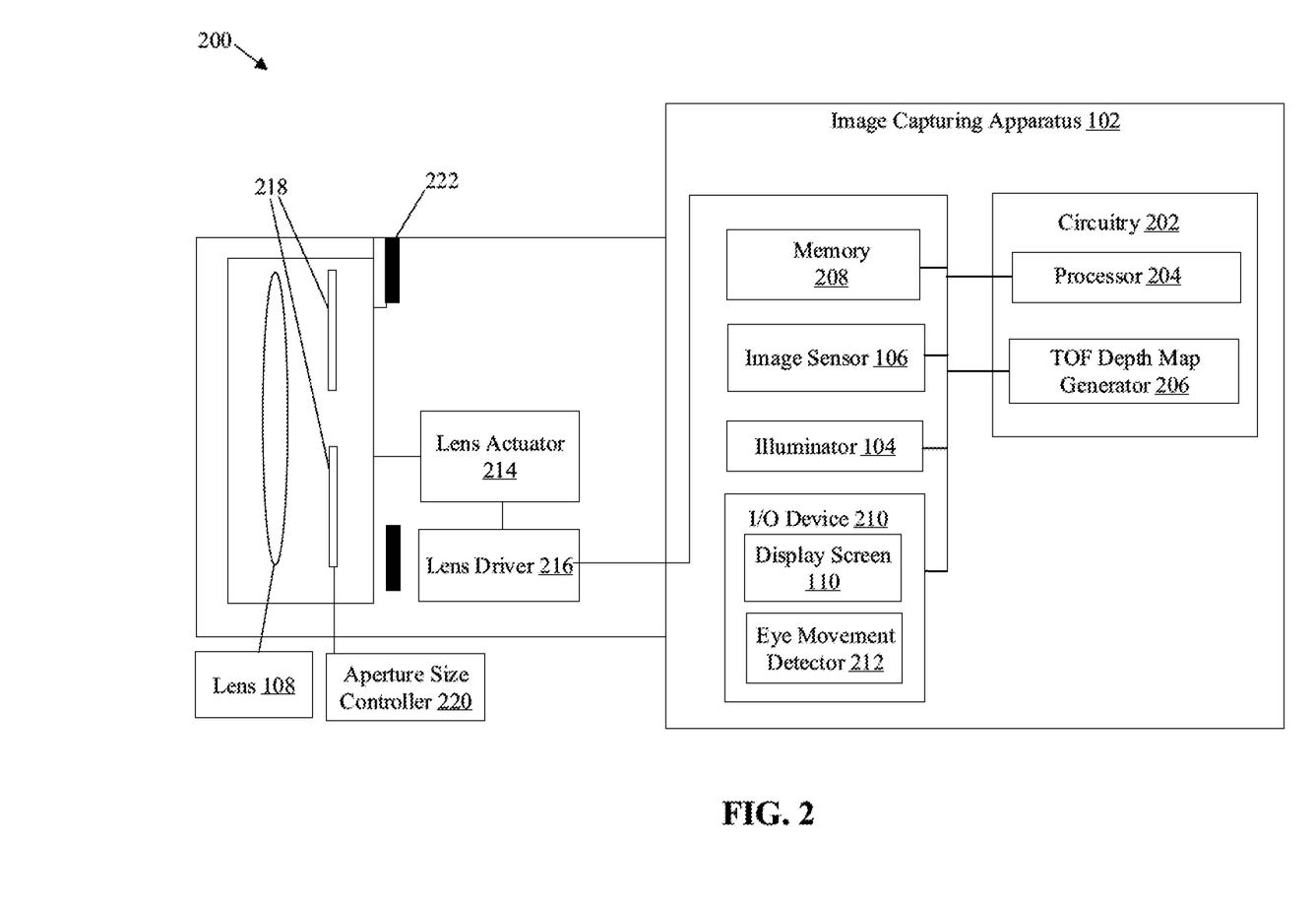
FIG. 2 is a block diagram that illustrates an exemplary image capturing apparatus for depth of field adjustment in images based on time of flight depth maps, in accordance with an embodiment of the disclosure.

FIG. 2 is a block diagram that illustrates an exemplary image capturing apparatus for depth of field adjustment in images based on time of flight depth maps, in accordance with an embodiment of the disclosure. FIG. 2 is explained in conjunction with elements from FIG. 1. With reference to FIG. 2, there is shown a block diagram 200 of the image capturing apparatus 102. The image capturing apparatus 102 may include circuitry 202. The circuitry 202 may include a processor 204 and a TOF depth map generator 206. The image capturing apparatus 102 may further include a memory 208 and an input/output (I/O) device 210. The I/O device 210 may include at least the display screen 110 and an eye movement detector 212. The image capturing apparatus 102 may further include the image sensor 106 communicatively coupled to each component of the circuitry 202 and the memory 208, via communication buses of the image capturing apparatus 102. In some embodiments, the image capturing apparatus 102 may further include the lens 108, a lens actuator 214, a lens driver 216, an aperture stop 218, an aperture size controller 220, and a shutter 222. The lens 108 may be coupled to the lens actuator 214 that may be coupled to the lens driver 216.

The processor 204 may comprise suitable logic, circuitry, and interfaces that may be configured to execute a set of instructions stored in the memory 208. The processor 204 may be implemented based on a number of processor technologies known in the art. The processor 204 may be configured to calculate the TOF of the first light signals emitted by the illuminator 104 on a plurality of objects (e.g., the plurality of objects 114A . . . 114N) of a scene (e.g., the scene 112). The TOF may be calculated based on a phase delay associated with the second light signals, received as a reflection of the first light signals from the surfaces of the plurality of objects of the scene. The processor 204 may be configured to determine a region of interest from a plurality of regions of the TOF depth map and adjust the DOF of one or more objects of the plurality of objects so as to capture an image of the scene with a focus on only the one or more objects. Examples of the processor 204 may include, but are not limited to, a Graphical Processing Unit (GPU), a Central Processing Unit (CPU), an x86-based processor, an x64-based processor, a Reduced Instruction Set Computing (RISC) processor, an image co-processor, an Application-Specific Integrated Circuit (ASIC) processor, a Complex Instruction Set Computing (CISC) processor.

The TOF depth map generator 206 may comprise suitable logic, circuitry, and interfaces that may be configured to store a set of instructions executable by the processor 204. The TOF depth map generator 206 may be configured to generate the TOF depth map of a scene that includes a plurality of objects, based on the calculated TOF. The TOF depth map may corresponds to a 2D matrix of distance values, where each distance value corresponds to a distance between the image plane of the image sensor 106 and a point (or a patch) on the surface of an object from the plurality of objects. In some embodiments, the TOF depth map generator 206 may be implemented based on one of an x86-based processor, a RISC processor, a field programmable gate array (FPGA), an ASIC processor, a programmable logic ASIC (PL-ASIC), a CISC processor, and other hardware processors. In other embodiments, the TOF depth map generator 206 may be implemented as programs/instructions executable at the processor 204 that may execute the functions of the TOF depth map generator 206 in a sequential or a parallelized executional paradigm.

The memory 208 may comprise suitable logic, circuitry, and interfaces that may be configured to store a set of instructions executable by the processor 204. The memory 208 may be configured to store data associated with operating systems and associated applications. The memory 208 may be configured to store instructions, one or more of which when provided to the circuitry 202 causes a determination of a region of interest from the plurality of regions of the TOF depth map. Examples of implementation of the memory 208 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

The I/O device 210 may comprise suitable logic, circuitry, and interfaces that may be configured to operate as an I/O channel/interface between the user 116 and the different operational components of the image capturing apparatus 102. The I/O device 210 may act as an interface for a reception of user-inputs and present outputs based on the user-inputs. The I/O device 210 may comprise various input and output ports that may communicate with different operational components of the image capturing apparatus 102. Examples of the input devices may include, but are not limited to, a touch screen, a keyboard, a mouse, a joystick, a microphone, and other image capture devices. Examples of the output devices may include, but are not limited to, a display (for example, the display screen 110), the eye movement detector 212, a haptic device, or other output devices.

The eye movement detector 212 may comprise suitable logic circuitry, and interfaces that may be configured to detect and track the eye movement of the user 116. The eye movement detector 212 may be further configured to determine a region as a region of interest from a plurality of regions of the TOF depth map, based on the track of the eye movement of the user 116. The eye movement detector 212 may be configured to utilize a vector between a pupil centre and corneal reflections from the eye of the user 116 to track the eye movement of the user 116. The eye movement detector 212 may be implemented by use of several technologies that are well known to those skilled in the art.

The lens actuator 214 may comprise suitable logic, circuitry, and/or interfaces that may be configured to control different optical parameters, such as an optical zoom and a focal length, of the lens 108 of the image capturing apparatus 102. The lens actuator 214 may internally be a part of the image capturing apparatus 102 or may be a stand-alone unit, in conjunction with the processor 204. The lens actuator 214 may be configured to move the lens 108 so as to adjust a position of the lens 108 with respect to a focal plane (i.e., an image plane) of the image sensor 106. The lens actuator 214 may be implemented by use of several technologies that are well known to those skilled in the art. In accordance with an embodiment, a motor (such as a stepper motor) may be implemented as the lens actuator 214.

The lens driver 216 may comprise suitable logic, circuitry, and/or interfaces that may be configured to control the lens actuator 214 to change the position of the lens 108, based on instructions received from the processor 204. The lens driver 216 may be implemented by use of several technologies that are well known to those skilled in the art.

The aperture stop 218 may be an opaque structure, such as an iris diaphragm, arranged (e.g., coplanar) adjacent to the lens 108. The aperture size of the aperture stop 218 controls a cone angle of light signals incident on the lens 108 and an amount of light signals that reach the image plane of the image sensor 106.

The aperture size controller 220 may comprise suitable logic, circuitry, and/or interfaces that may be configured to set the aperture size of the aperture stop 218 associated with the lens 108 based on a required DOF for one or more objects in FOV of the image capturing apparatus 102. For example, a change in the aperture size of the aperture stop for a lens with a lens diameter of "22 mm" may correspond to change in an f-stop between "f/1.2 to f/22".

The shutter 222 may comprise suitable logic, circuitry, and/or interfaces that may be configured to allow the reflected light, from the surfaces of the plurality of objects to pass for a determined period. The shutter 222 may be further configured to expose the image sensor 106 to reflected light in order to capture an image that comprises the plurality of objects. The shutter 222 may be implemented by use of several technologies that are well known to those skilled in the art.

The operations associated with the circuitry 202 are shown to be executed collectively by the processor 204 and the TOF depth map generator 206. However, in some embodiments, the operations of the TOF depth map generator 206 may be executed by the processor 204. The functions or operations executed by the image capturing apparatus 102 (as described in FIG. 1) may be executed by the circuitry 202, as described, for example, in detail in FIGS. 3, 4, and 5.

Figure 3:
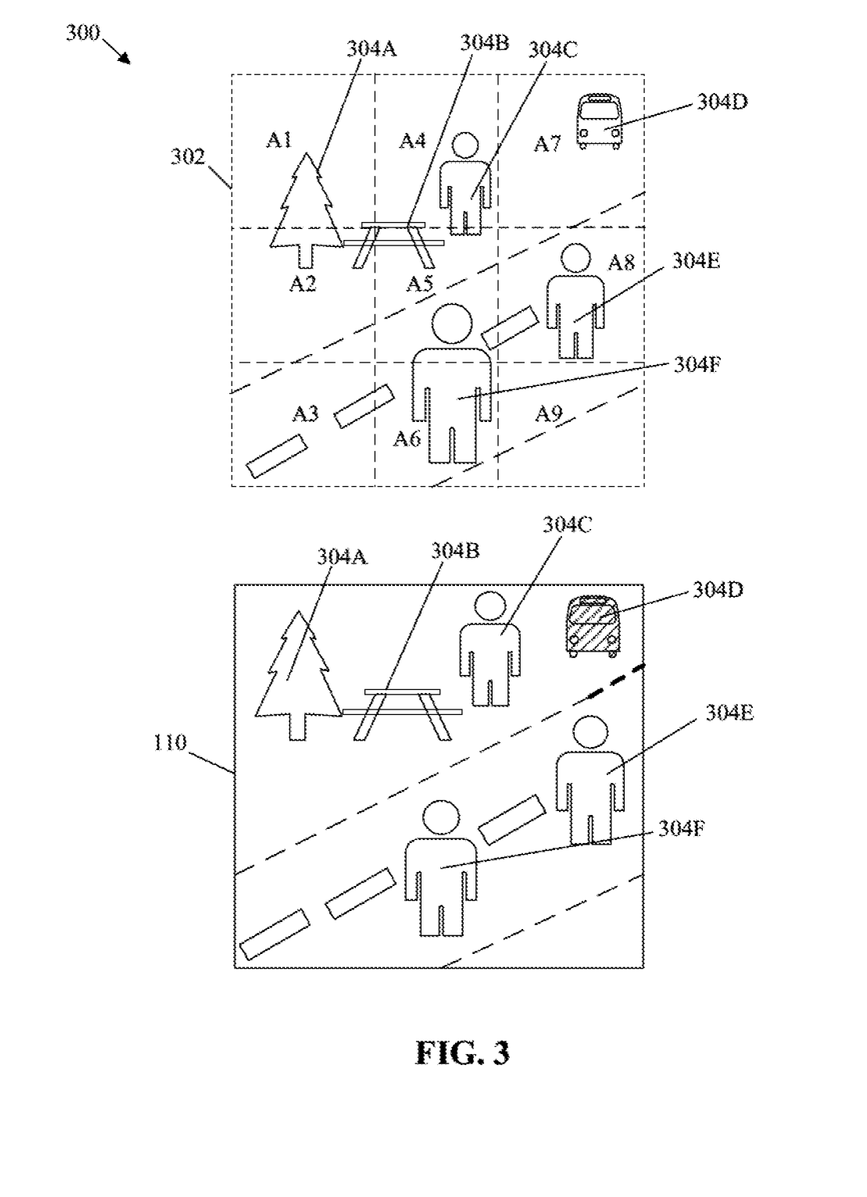
FIG. 3 illustrates an exemplary scenario for implementation of an image capturing apparatus to control depth of field using time of flight, in accordance with an embodiment of the disclosure.

FIG. 3 illustrates an exemplary scenario for implementation of an image capturing apparatus to control depth of field using time of flight, in accordance with an embodiment of the disclosure. FIG. 3 is explained in conjunction with elements from FIGS. 1 and 2. With reference to FIG. 3, there is shown scenario 300 for implementation of the image capturing apparatus 102. In the scenario 300, there is shown a TOF depth map 302 of a scene that includes a plurality of objects 304A, 304B, 304C, 304D, 304E, and 304F which are logically divided into a plurality of areas ("A1, A2, A3, A4, A5, A6, A7, A8, and A9"). There is also shown the display screen 110 of the image capturing apparatus 102. A captured image of the plurality of objects 304A, 304B, 304C, 304D, 304E, and 304F is shown on the display screen 110, which may be associated with the image capturing apparatus 102.

The processor 204 may be configured to generate the TOF depth map 302 of the scene (including the plurality of objects 304A, 304B, 304C, 304D, 304E, and 304F) based on calculation of the TOF of the modulated light signals from the plurality of objects 304A, 304B, 304C, 304D, 304E, and 304F. The image capturing apparatus 102 may be further configured to divide the generated TOF depth map 302 into the plurality of regions ("A1, A2, A3, A4, A5, A6, A7, A8, and A9"). Each of the plurality of objects 304A, 304B, 304C, 304D, 304E, and 304F may correspond to at least one of the plurality of regions ("A1, A2, A3, A4, A5, A6, A7, A8, and A9"). The processor 204 may be configured to determine at least one of the plurality of regions as the region of interest (such as "A7"). As an example, the region of interest may be determined based on a track of the eye movement of the user 116. In such cases, the region of interest may correspond to one or more objects that fall in line of sight (LOS) of the user 116. In accordance with an embodiment, the processor 204 may be configured to detect and track the plurality of objects 304A, 304B, 304C, 304D, 304E, and 304F over a period of time in the scene. Such detection and track of the plurality of objects 304A, 304B, 304C, 304D, 304E, and 304F may be utilized to divide the TOF depth map into a plurality of regions and to further adjust a DOF of one or more objects that correspond to the region of interest, e.g., a region represented by "A7".

In accordance with an embodiment, the processor 204 may be further configured to monitor at least two objects of the plurality of objects 304A, 304B, 304C, 304D, 304E, and 304F that may change positions in the scene. The positions of the at least two objects may be detected by the processor 204, based on the calculated TOF. From the plurality of objects 304A, 304B, 304C, 304D, 304E, and 304F, a set of objects that remain in same region for a long time (e.g. for a duration equivalent to "10 frames" in a "30 frames per second" (fps) video) may be identified as a single object. The processor 204 may be configured to detect the plurality of objects 304A, 304B, 304C, 304D, 304E, and 304F based on monitoring the change in positions of the at least two objects.

The processor 204 may be configured to determine a region of interest associated with a first object from the plurality of objects 304A, 304B, 304C, 304D, 304E, and 304F, where the plurality of objects 304A, 304B, 304C, 304D, 304E, and 304F may be in motion. The eye movement may be tracked corresponding to the first object, in order to determine the region of interest. In particular, the processor 204 may be configured to select a first object from the plurality of objects 304A, 304B, 304C, 304D, 304E, and 304F as an object of interest that corresponds to the determined region of interest. In certain cases, after the selection of first object as the object of interest, the first object changes its position. The first object may also change its position with respect to a second object from the plurality of objects 304A, 304B, 304C, 304D, 304E, and 304F. The processor 204 may be further configured to determine the change in the position of the first object based on the generated TOF depth map. The processor 204 may be further configured to identify the position of the first object, (as the object of interest) after a change in the position, with respect to the second object. The position may be identified based on the TOF depth map.

The processor 204 may be further configured to adjust a focus on the one or more objects (e.g. the first object) corresponding to the determined region of interest. The focus may be adjusted by an adjustment of a depth of field (such as, a POF of the image sensor 106) on the one or more objects in the scene. In some embodiments, the processor 204 may be configured to determine an aperture size (i.e. a current aperture size) of the aperture stop 218 in the image capturing apparatus 102. The processor 204 may be further configured to control the aperture size controller 220 to set an aperture size based on the determined region of interest. The aperture size of the aperture stop 218 may be set with respect to the determined aperture size associated with the aperture stop 218. In some cases, an increase in value of the aperture size may correspond to a decrease in value of a diameter (D) (open area) of the lens 108 with a focal length (f). The set value of the aperture size may also correspond to a set value of an f-number or an f-stop for the image capturing apparatus 102. As an example, for a lens with a maximum lens diameter of "22 mm", the f-number may vary from "f/1.2 to f/22".

The processor 204 may be configured to determine a focal length of the lens 108 and control the lens actuator 214 (such as a stepper motor) to adjust a position of the lens 108 with respect to a focal plane of the image sensor 106, based on the determined region of interest. The position of the lens 108 may be adjusted to set a required DOF as per the determined region of interest. As an example, in order to achieve a sharp focus on the one or more objects, the position of the lens 108 may be adjusted to adjust a distance between a rear nodal point (a part of a nodal point) and the image plane of the image sensor 106. The focal length (f) may depend on a distance from the front nodal point to one or more objects in scene and a distance from the rear nodal point to the image plane of the image sensor 106. In accordance with an embodiments, both the position of lens 108 and the aperture size may be adjusted to achieve a desired depth of field of the one or more objects.

The processor 204 may be further configured to control the image sensor 106 to capture an image of the scene in the FOV of the image capturing apparatus 102, in accordance with the adjusted DOF corresponding to the region of interest, e.g., a region represented by "A7". As an example, the image sensor 106 may be configured to capture the image such that only the object 304D corresponding to the region of interest ("A7") remains in focus and the rest of the plurality of objects (such as 304A, 304B, 304C, 304E, and 304F) corresponding to the plurality of regions (such as A1, A2, A3, A4, A5, A6, A8, and A9) appear blurry (or out of focus). Such effect may also be achieved by applying various image processing techniques on the captured image based on the calculated TOF.

In some embodiments, the image capturing apparatus 102 may lack different components, such as the lens actuator 214, the aperture stop 218, the aperture size controller 220, and the shutter 222. Such components may be required to adjust the position of the lens 108 and the aperture size, respectively. For example, the image capturing apparatus 102 may be a fixed focal length camera device (e.g., a fixed focal length (FFL) smartphone camera) with an FFL lens over the image sensor 106. In such cases, the image capturing apparatus 102 may be configured to apply a blur to a portion of the captured image. The blurred portion may correspond to a second region of the plurality of regions. The second region may be different from the region of interest. Except the blurred portion, the remaining portion of the captured image may appear to be in focus in the captured image.

Figure 4:
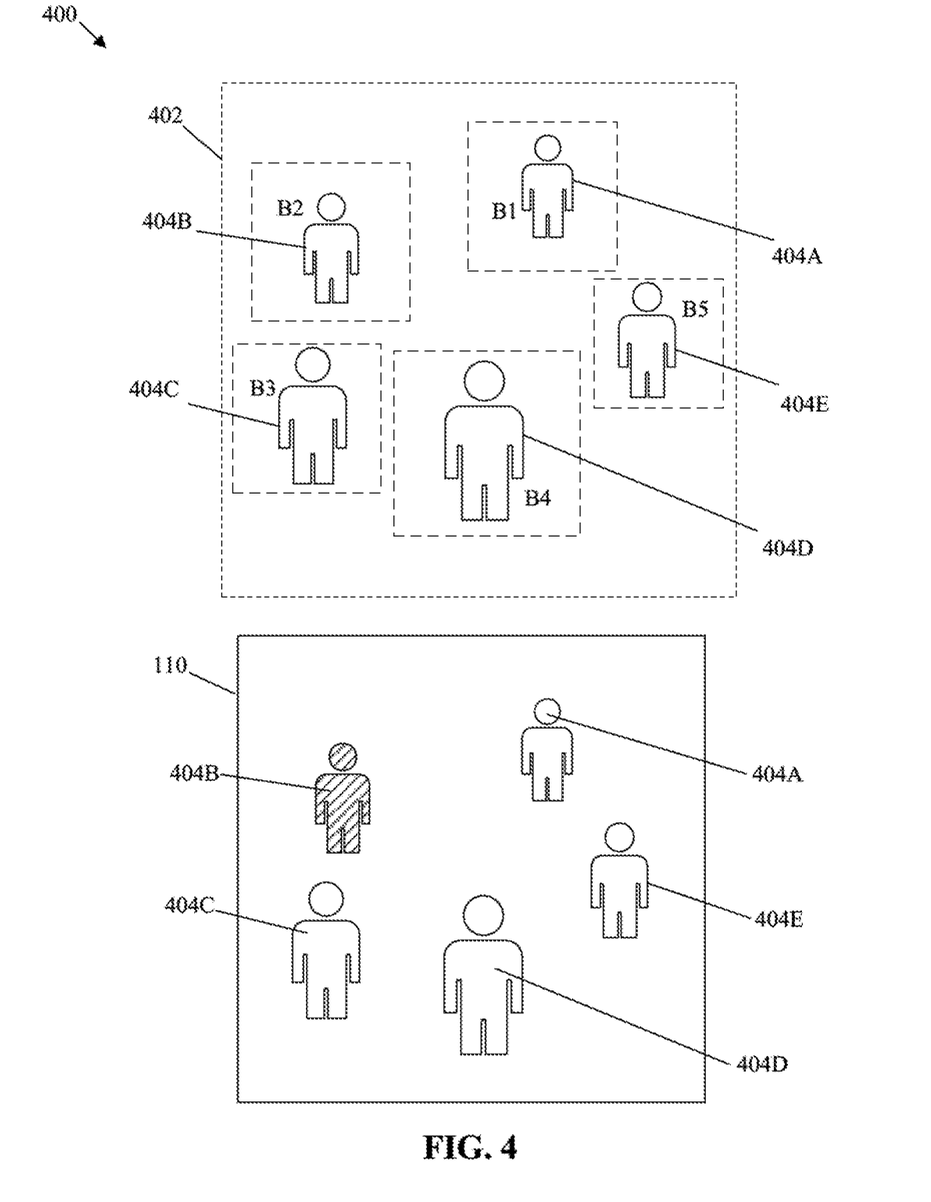
FIG. 4 illustrates another exemplary scenario for implementation of an image capturing apparatus for depth of field adjustment in images based on time of flight depth maps, in accordance with an embodiment of the disclosure.

FIG. 4 illustrates another exemplary scenario for implementation of an image capturing apparatus for depth of field adjustment in images based on time of flight depth maps, in accordance with an embodiment of the disclosure. FIG. 4 is explained in conjunction with elements from FIGS. 1, 2, and 3. With reference to FIG. 4, there is shown another scenario 400 for implementation of the image capturing apparatus 102. In the scenario 400, there is shown a TOF depth map 402 that depicts a plurality of objects 404A, 404B, 404C, 404D, and 404E of a scene. The TOF depth map 402 is divided into a plurality of areas ("B1, B2, B3, B4, and B5"). There is further shown a captured image of the plurality of objects 404A, 404B, 404C, 404D, and 404E on the display screen 110.

In accordance with an embodiment, the processor 204 may be configured to generate the TOF depth map 402 of the scene that includes the plurality of objects 404A, 404B, 404C, 404D, and 404E based on the determined TOF of the light emitted from the illuminator 104 (as described in FIG. 1, FIG. 2, and FIG. 3). Also, the processor 204 may be configured to detect the plurality of objects 404A, 404B, 404C, 404D, and 404E in the foreground region of the scene, as described in FIGS. 1, 2, and 3.

The processor 204 may be further configured to divide the generated TOF depth map 402 into the plurality of regions ("B1, B2, B3, B4, and B5"). The plurality of regions ("B1, B2, B3, B4, and B5") may be divided only for the plurality of objects 404A, 404B, 404C, 404D, and 404E that are in the foreground region of the scene. The processor 204 may be further configured to determine the region of interest (B2) from the plurality of regions ("B1, B2, B3, B4, and B5").

The processor 204 may be further configured to determine the aperture size of the aperture stop 218 and the value of the focal length of the lens 108 corresponding to the region of interest ("B2") (as described in FIG. 3). The processor 204 may be further configured to adjust the aperture size and the focal length of the lens 108 to control the DOF of the object 402B corresponding to the region of interest ("B2"). The processor 204 may be further configured to control the image sensor 106 to capture an image of the scene that includes the object 402B in focus and remaining objects from the plurality of objects 404A, 404B, 404C, 404D, and 404E as out of focus, based on the adjusted DOF that corresponds to the region of interest ("B2").

Figure 5:
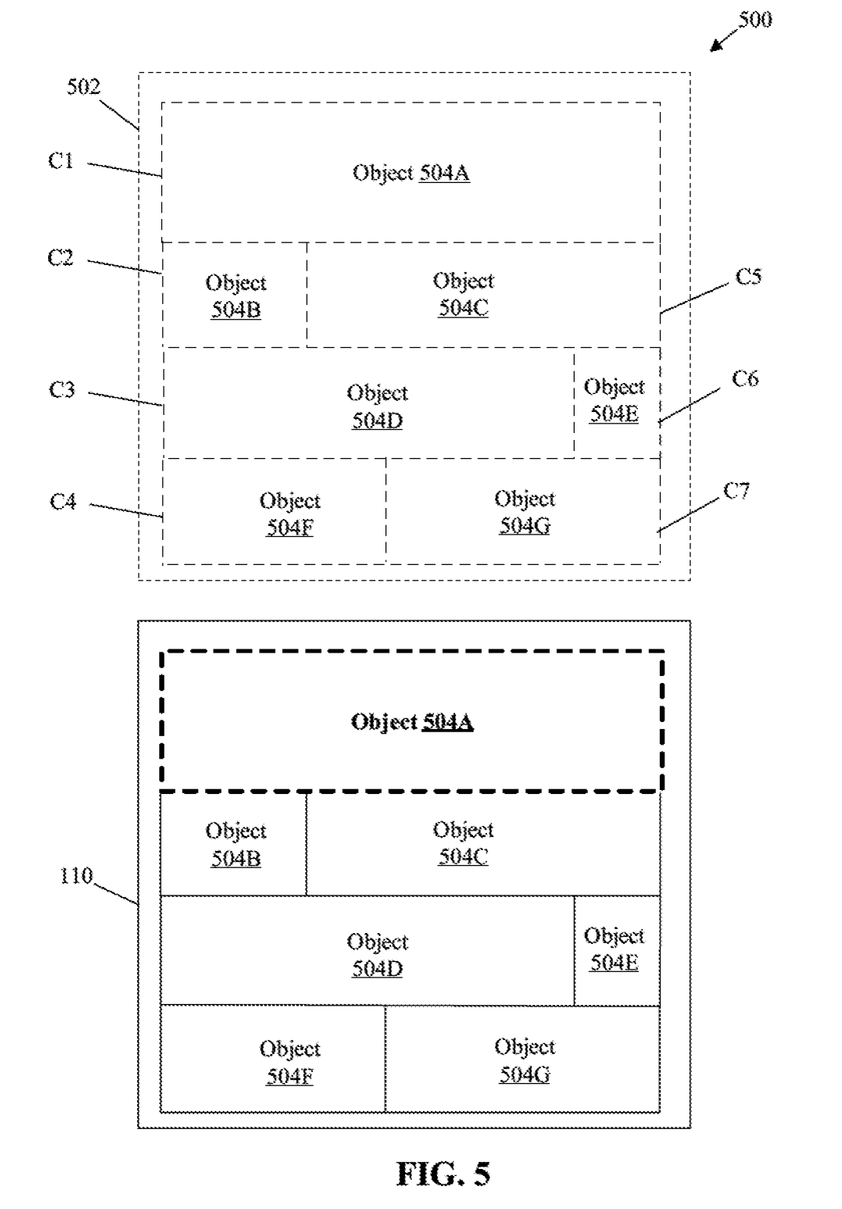
FIG. 5 illustrates yet another exemplary scenario for implementation of an image capturing apparatus for depth of field adjustment in images based on time of flight depth maps, in accordance with an embodiment of the disclosure.

FIG. 5 illustrates yet another exemplary scenario for implementation of an image capturing apparatus for depth of field adjustment in images based on time of flight depth maps, in accordance with an embodiment of the disclosure. FIG. 5 is explained in conjunction with elements from FIGS. 1, 2, 3, and 4.

With reference to FIG. 5, there is shown yet another scenario 500 for implementation of the image capturing apparatus 102. In the scenario 500, there is shown a TOF depth map 502 of a scene that includes a plurality of objects 504A, 504B, 504C, 504D, 504E, 504F, and 504G. The TOF depth map 502 is divided in a plurality of regions ("C1, C2, C3, C4, C5, C6, and C7"). There is further shown a captured image that depicts the plurality of objects 504A, 504B, 504C, 504D, 504E, 504F, and 504G on the display screen 110 of the image capturing apparatus 102.

In accordance with an embodiment, the processor 204 may be configured to generate the TOF depth map 502 of the scene (includes the plurality of objects 504A, 504B, 504C, 504D, 504E, 504F, and 504G) based on the determined TOF. The processor 204 may be further configured to divide the generated TOF depth map 502 into the plurality of regions ("C1, C2, C3, C4, C5, C6, and C7") in accordance with a size of each of the plurality of objects 504A, 504B, 504C, 504D, 504E, 504F, and 504G based on the TOF of the light signals emitted from the illuminator 104.

The processor 204 may be further configured to determine the region of interest ("C1") corresponding to object 504A of the plurality of objects 504A, 504B, 504C, 504D, 504E, 504F, and 504G. The processor 204 may be further configured to determine the size of the aperture and a position of the lens 108 (such as a lens in an assembly of lenses) with respect to the image plane, to adjust the DOF corresponding to the region of interest ("C1"). The processor 204 may be further configured to capture the image of the scene that includes the plurality of objects 504A, 504B, 504C, 504D, 504E, 504F, and 504G, based on the adjusted DOF that corresponds to the region of interest ("C1").

Figure 6A:
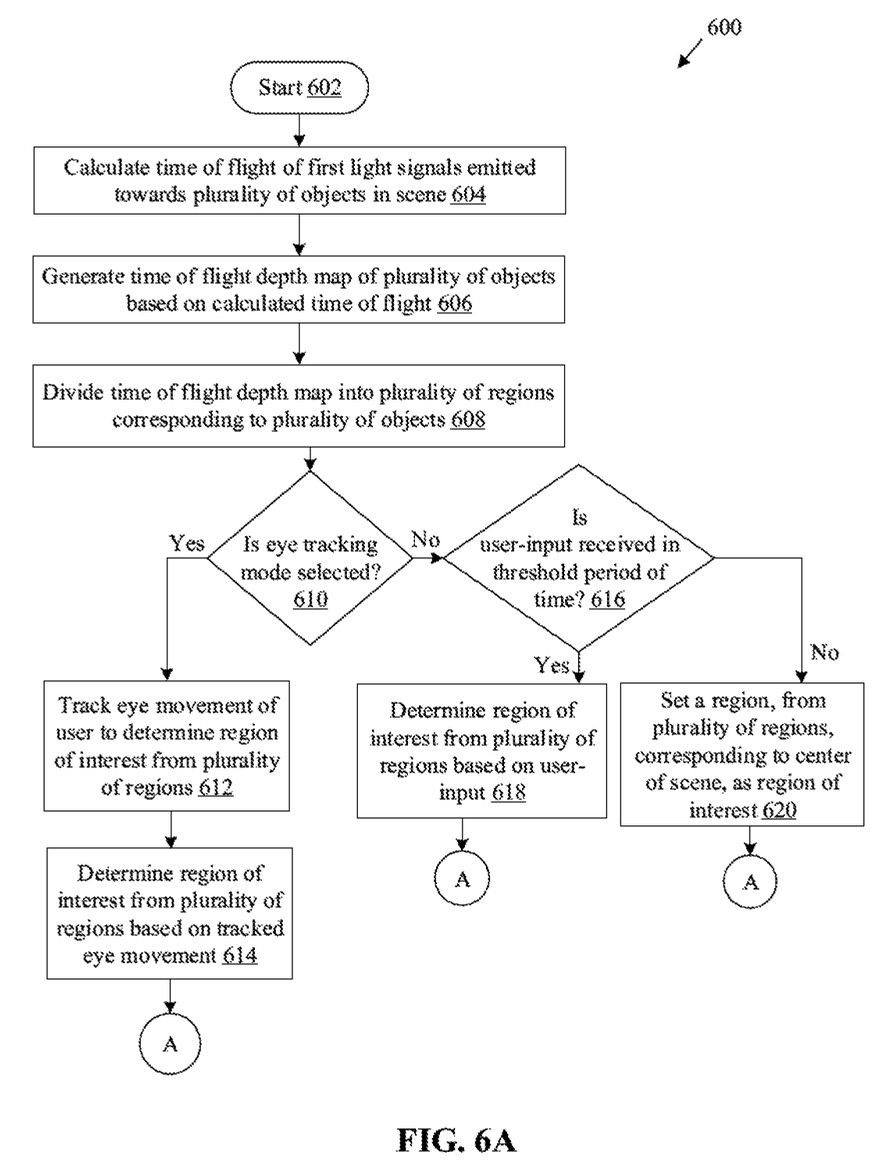
FIGS. 6A and 6B, collectively, depicts a flowchart that illustrates exemplary operations for depth of field adjustment in images based on time of flight depth maps, in accordance with an embodiment of the disclosure.
Figure 6B:
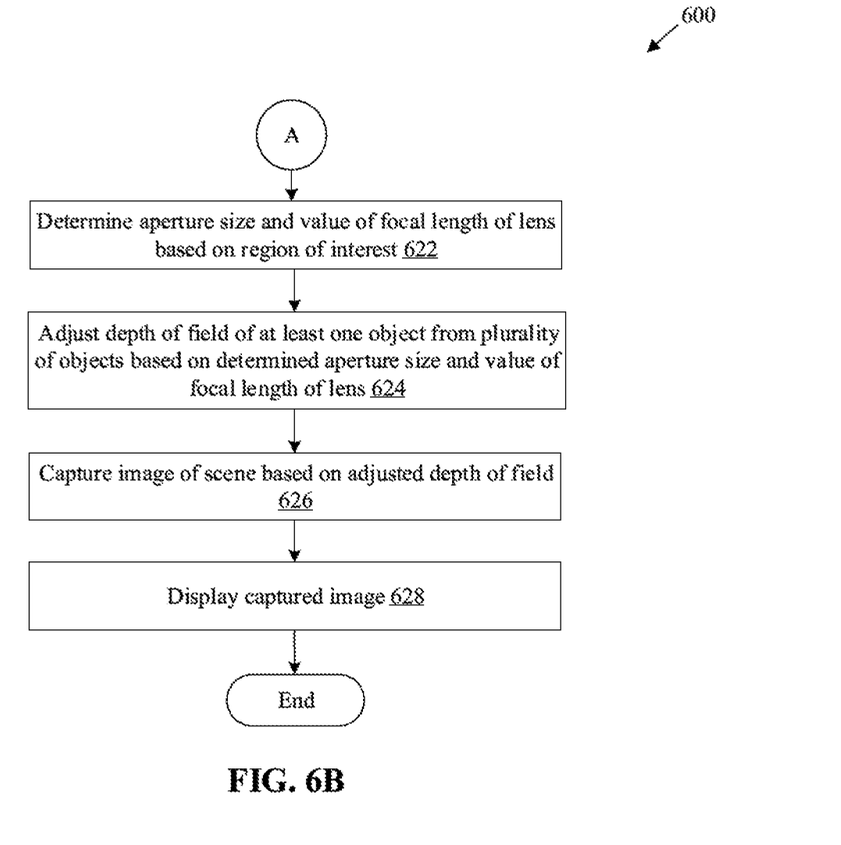

FIGS. 6A and 6B, collectively, depicts a flowchart that illustrates exemplary operations for depth of field adjustment in images based on time of flight depth maps, in accordance with an embodiment of the disclosure. With reference to FIGS. 6A and 6B, there is shown a flowchart 600. The flowchart 600 is described in conjunction with elements from FIGS. 1, 2, 3, 4, and 5. The operations from 602 to 628 may be implemented in the image capturing apparatus 102. The method starts at 602 and proceeds to 604.

At 604, a time of flight of first light signals emitted towards a plurality of objects in a scene may be calculated. The image capturing apparatus 102 may be configured to calculate the time of flight (TOF) of the first light signals emitted towards the plurality of objects (e.g., the plurality of objects 114A . . . 114N) in the scene, based on second light signals that correspond to a reflection of the emitted first light signals from the surfaces of the plurality of objects. The plurality of objects may be illuminated by the image capturing apparatus 102 using the illuminator 104, as described in detail in FIG. 1.

At 606, a TOF depth map may be generated based on the calculated TOF. The image capturing apparatus 102 may be further configured to generate the TOF depth map of the scene that includes the plurality of objects, based on the calculated TOF of the light signals emitted on the plurality of objects in the scene, as discussed above in FIGS. 1 and 3.

At 608, the TOF depth map may be divided into a plurality of regions corresponding to the plurality of objects. The image capturing apparatus 102 may be further configured to divide the generated TOF depth map into the plurality of regions corresponding to the plurality of objects in the scene. Examples of the division of the TOF depth map into the plurality of regions are shown in FIGS. 3, 4, and 5.

At 610, it may be determined whether an eye movement tracking mode is selected. The image capturing apparatus 102 may be further configured to determine whether the eye tracking mode of the image capturing apparatus 102 is selected. In case the eye tracking mode is selected, control passes to 612. Otherwise, control passes to 616.

At 612, an eye movement of the user 116 may be tracked to determine a region of interest from the plurality of regions. The image capturing apparatus 102 may be configured to track the eye movement of the user 116 to determine the region of interest from the plurality of regions.

At 614, the region of interest from the plurality of regions may be determined, based on the tracked eye movement. The image capturing apparatus 102 may be configured to determine the region of interest from the plurality of regions, based on the tracking of the eye movement of the user 116.

At 616, it may be determined whether a user-input is received in a threshold period of time. The image capturing apparatus 102 may be configured to determine whether the user-input is received in the threshold period of time. In case the user-input is received in the threshold period of time, control passes to 618. Otherwise, control passes to 620.

At 618, the region of interest from the plurality of regions may be determined based on the user-input. The image capturing apparatus 102 may be configured to determine the region of interest from the plurality of regions based on the user-input.

At 620, a region of the plurality of regions corresponding to the center of the scene may be set as the region of interest. The image capturing apparatus 102 may be further configured to set, by default, a region of the plurality of regions corresponding to the center of the scene as the region of interest.

At 622, an aperture size and a value of the focal length of the lens 108 may be determined based on the region of interest. The image capturing apparatus 102 may be configured to determine the aperture size of an aperture stop and the value of the focal length of the lens 108 based on the region of interest.

At 624, a depth of field of the at least one object from the plurality of objects may be adjusted, based on the determined aperture size and the value of the focal length of the lens 108. The image capturing apparatus 102 may be further configured to set the aperture size and the value of the focal length of the lens 108 to adjust the depth of field (DOF) of the one or more objects from the plurality of objects.

At 626, an image of the scene may be captured based on the adjusted DOF. The image capturing apparatus 102 may be further configured to control the image sensor 106 to capture the image of the scene based on the adjusted DOF of the one or more objects from the plurality of objects. The image capturing apparatus 102 may be configured to capture the image such that objects that correspond to only the region of interest remains in focus and the rest of the objects appear blurry or out of focus in the captured image.

At 628, the captured image may be displayed. The image capturing apparatus 102 may be further configured to display the captured image on the display screen 110. Control passes to end.

Exemplary aspects of the disclosure may provide an image capturing apparatus (such as the image capturing apparatus 102) that may include an image sensor (such as the image sensor 106) and circuitry (such as the circuitry 202) configured to generate a Time of flight (TOF) depth map of a scene (such as the scene 112) that includes a plurality of objects (such as the plurality of objects 114A . . . 114N). The TOF depth map may include information associated with distances between the image sensor and surfaces of the plurality of objects. The circuitry may be further configured to divide the generated TOF depth map into a plurality of regions. The circuitry may be further configured to determine a region of interest from the plurality of regions. The circuitry may be further configured to adjust a Depth of field (DOF) of the at least one object from the plurality of objects. The at least one object may correspond to the region of interest in the generated TOF depth map. The circuitry may be further configured to control the image sensor to capture an image of the scene based on the adjusted DOF.

In accordance with an embodiment, the circuitry may be further configured to blur a portion of the captured image. The blurred portion may correspond to a second region of the plurality of regions. The second region is different from the region of interest. The region of interest may correspond to a Plane of Focus (POF).

In accordance with an embodiment, the image capturing apparatus may further include an eye movement detector (such as the eye movement detector 212). The circuitry may be further configured to track an eye movement of a user (such as the user 116) associated with the image capturing apparatus. The circuitry may be further configured to determine the region of interest based on the tracked eye movement of the user.

In accordance with an embodiment, the image capturing apparatus may further include at least illuminator (such as the illuminator 104). The circuitry may be further configured to control the at least one illuminator to emit first light signals to irradiate at least the plurality of objects of the scene. The circuitry may further control the image sensor to receive second light signals that is a reflection of the first light signals from the surfaces of the plurality of objects. The circuitry may be further configured to calculate a Time of flight (TOF) for the plurality of objects based on the emitted first light signals and the received second light signals. The circuitry may further calculate the distances between the image sensor and the surfaces of the plurality of objects based on the calculated TOF. The circuitry may further generate the TOF depth map of the plurality of objects based on the calculated distances.

In accordance with an embodiment, the image capturing apparatus may further include a lens actuator (such as the lens actuator 214) and at least one lens (such as the lens 108). In accordance with an embodiment, the circuitry may be further configured to control the lens actuator to adjust a position of the at least one lens based on the determined region of interest.

In accordance with an embodiment, the image capturing apparatus may further include an aperture size controller (such as the aperture size controller 220). The circuitry may be configured to control the aperture size controller to set an aperture size of an aperture stop (e.g., the aperture stop 218) of the image capturing apparatus based on the determined region of interest. The DOF of the at least one object may be adjusted further based on the set aperture size and the adjusted position of the at least one lens.

In some embodiments, the region of interest may correspond to a center position of the generated TOF depth map. In other embodiments, the circuitry may be configured to receive a user-input corresponding to the divided TOF depth map. The circuitry may be further configured to determine the region of interest based on the received user-input.

In accordance with an embodiment, the circuitry may be further configured to detect the plurality of objects based on the generated TOF depth map. The circuitry may further divide the generated TOF depth map into the plurality of regions based on the detection of the plurality of objects. The circuitry may be configured to divide the generated TOF depth map into the plurality of regions based on a size of each of the plurality of objects in the generated TOF depth map.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An image capturing apparatus, comprising:
    an image sensor;
    at least one illuminator; and
    circuitry configured to:
        control the at least one illuminator to emit first light signals to irradiate a plurality of objects in a scene;
        control the image sensor to receive second light signals that correspond to a reflection of the emitted first light signals from surfaces of the plurality of objects in the scene;
        calculate a Time of flight (TOF) of the emitted first light signals based on the emitted first light signals and the received second light signals;
        calculate distances between the image sensor and the surfaces of the plurality of objects based on the calculated TOF;
        generate, based on the calculated distances, a TOF depth map of the scene that includes the plurality of objects, wherein the TOF depth map includes information associated with the distances between the image sensor and the surfaces of the plurality of objects;
        divide the generated TOF depth map into a plurality of regions, wherein each of the plurality of regions includes at least one object of the plurality of objects;
        determine a region of interest from the plurality of regions;
        adjust a Depth of field (DOF) of the at least one object from the plurality of objects, wherein the at least one object corresponds to the region of interest in the generated TOF depth map; and
        control the image sensor to capture an image of the scene, wherein the capture of the image is based on the adjusted DOF.

2. The image capturing apparatus according to claim 1, wherein
    the circuitry is further configured to blur a portion of the captured image,
    the blurred portion corresponds to a region of the plurality of regions, and
    the region is different from the region of interest.

3. The image capturing apparatus according to claim 1, wherein the region of interest corresponds to a Plane of Focus (POF) of the image sensor.

4. The image capturing apparatus according to claim 1, further comprising an eye movement detector circuit,
    wherein the circuitry is further configured to:
        control the eye movement detector circuit to track an eye movement of a user associated with the image capturing apparatus; and
        determine the region of interest based on the tracked eye movement of the user.

5. The image capturing apparatus according to claim 1, further comprising:
    at least one lens; and
    a lens actuator,
        wherein the circuitry is further configured to control, based on the determined region of interest, the lens actuator to adjust a position of the at least one lens with respect to a focal plane of the image sensor.

6. The image capturing apparatus according to claim 5, further comprising an aperture size controller, wherein
    the circuitry is further configured to:
        control, based on the determined region of interest, the aperture size controller to set an aperture size of an aperture stop of the image capturing apparatus; and
        adjust the DOF of the at least one object based on the set aperture size and the adjusted position of the at least one lens.

7. The image capturing apparatus according to claim 1, wherein the region of interest corresponds to a center position of the scene.

8. The image capturing apparatus according to claim 1, wherein the circuitry is further configured to:
    receive a user input; and
    determine the region of interest from the plurality of regions based on the received user input.

9. The image capturing apparatus according to claim 1, wherein the circuitry is further configured to:
    detect the plurality of objects based on the generated TOF depth map; and
    divide the generated TOF depth map into the plurality of regions based on the detection of the plurality of objects.

10. The image capturing apparatus according to claim 1, wherein the circuitry is further configured to divide the generated TOF depth map into the plurality of regions based on a size of each of the plurality of objects in the generated TOF depth map.

11. A method, comprising:
    in an image capturing apparatus that includes an image sensor and at least one illuminator:
        controlling the at least one illuminator to emit first light signals to irradiate a plurality of objects in a scene;
        controlling the image sensor to receive second light signals that correspond to a reflection of the emitted first light signals from surfaces of the plurality of objects in the scene;

calculating a Time of flight (TOF) of the emitted first light signals based on the emitted first light signals and the received second light signals;

calculating distances between the image sensor and the surfaces of the plurality of objects based on the calculated TOF;

generating, based on the calculated distances, a TOF depth map of the scene that includes the plurality of objects, wherein the TOF depth map includes information associated with the distances between the image sensor and the surfaces of the plurality of objects;

dividing the generated TOF depth map into a plurality of regions, wherein each of the plurality of regions includes at least one object of the plurality of objects;

determining a region of interest from the plurality of regions;

adjusting a Depth of field (DOF) of the at least one object from the plurality of objects, wherein the at least one object corresponds to the region of interest in the generated TOF depth map; and controlling the image sensor to capture an image of the scene, wherein the capture of the image is based on the adjusted DOF.

12. The method according to claim 11, further comprising blurring a portion of the captured image, wherein
the blurred portion corresponds to a region of the plurality of regions, and
the region is different from the region of interest.

13. The method according to claim 11, wherein the region of interest corresponds to a Plane of Focus (POF) of the image sensor.

14. The method according to claim 11, further comprising:
tracking an eye movement of a user associated with the image capturing apparatus; and
determining the region of interest based on the tracked eye movement of the user.

15. The method according to claim 11, further comprising controlling, based on the determined region of interest, a lens actuator of the image capturing apparatus to adjust a position of at least one lens of the image capturing apparatus with respect to a focal plane of the image sensor.

16. The method according to claim 15, further comprising:
controlling, based on the determined region of interest, an aperture size controller to set an aperture size of an aperture stop of the image capturing apparatus; and
adjusting the DOF of the at least one object based on the set aperture size and the adjusted position of the at least one lens.

17. The method according to claim 11, wherein the region of interest corresponds to a center position of the scene.

18. The method according to claim 11, further comprising:
receiving a user input; and
determining the region of interest from the plurality of regions based on the received user input.

* * * * *